(12) United States Patent
Chung et al.

(10) Patent No.: US 12,733,577 B2
(45) Date of Patent: Sep. 15, 2026

(54) GARDEN TOOL WITH TOOLLESSLY INTERCHANGEABLE WHEEL

(71) Applicant: TECHTRONIC CORDLESS GP, Anderson, SC (US)

(72) Inventors: Koon For Chung, Hong Kong (CN); Yan Jia Wang, Dongguan City (CN)

(73) Assignee: Techtronic Cordless GP, Anderson, SC (US)

( * ) Notice: Subject to any disclaimer, the term of this patent is extended or adjusted under 35 U.S.C. 154(b) by 529 days.

(21) Appl. No.: 18/187,513

(22) Filed: Mar. 21, 2023

(65) Prior Publication Data

US 2023/0301234 A1 Sep. 28, 2023

Related U.S. Application Data

(60) Provisional application No. 63/323,013, filed on Mar. 23, 2022.

(51) Int. Cl.

*A01D 34/82* (2006.01)
*A01D 69/02* (2006.01)
*A01D 101/00* (2006.01)

(52) U.S. Cl.

CPC ............. *A01D 34/82* (2013.01); *A01D 69/02* (2013.01); *A01D 2101/00* (2013.01)

(58) Field of Classification Search

CPC ..... A01D 34/82; A01D 69/02; A01D 2101/00
See application file for complete search history.

(56) References Cited

U.S. PATENT DOCUMENTS 2,776,844 A 1/1957 Wilkin
3,877,672 A * 4/1975 Wright ...................... B60P 7/13 248/503
4,477,121 A * 10/1984 Atkins .................... B60B 37/04 301/124.2
4,591,211 A * 5/1986 Browning ............... B60B 3/142 301/35.52
5,713,708 A * 2/1998 Van derDrift ........... F16B 39/32 411/300
5,800,022 A * 9/1998 Del Rosario .......... A63C 17/06 403/348
5,882,087 A * 3/1999 Post ..................... A63C 17/226 301/110.6

(Continued)

FOREIGN PATENT DOCUMENTS

CN 201557390 A 8/2010
CN 111543167 A 8/2020

(Continued)

OTHER PUBLICATIONS

Fearless Front (Todd Christopher), "How to: Bigger tires on a lawnmower" (Jan. 9, 2010), retrieved from www.youtube.com/watch?v=buRrOd8vz34 on Aug. 20, 2025 (Year: 2010).*

(Continued)

*Primary Examiner* — Claude J Brown
(74) *Attorney, Agent, or Firm* — Michael Best & Friedrich LLP

(57) ABSTRACT

A garden tool includes a deck, a motor, an implement configured to be driven by the motor, a wheel shaft, and a wheel removably coupled to the wheel shaft by way of a toolless shaft nut assembly. The toolless shaft nut assembly configured to self-lock.

20 Claims, 15 Drawing Sheets

(56) References Cited

U.S. PATENT DOCUMENTS

| | | | | |
|---|---|---|---|---|
| 6,349,994 | B1 * | 2/2002 | Chapman | B60B 33/0028 301/113 |
| 2003/0025292 | A1 * | 2/2003 | Hargroder | A61G 5/1035 280/250.1 |
| 2011/0078990 | A1 | 4/2011 | Vachal | |
| 2019/0168540 | A1 * | 6/2019 | Schlags | B60B 3/001 |
| 2019/0239428 | A1 * | 8/2019 | Levin | A01D 34/008 |

FOREIGN PATENT DOCUMENTS

| | | | |
|---|---|---|---|
| CN | 214545686 | U | 11/2021 |
| EP | 2719548 | A1 | 4/2014 |
| WO | 2013119709 | A2 | 8/2013 |

OTHER PUBLICATIONS

Screenshot from FearlessFront video at 3:41 (Year: 2010).*

Extended European Search Report for Application No. 23163336.3 dated Apr. 11, 2024 (10 pages).

* cited by examiner

GARDEN TOOL WITH TOOLLESSLY INTERCHANGEABLE WHEEL

CROSS-REFERENCE TO RELATED APPLICATIONS

This application claims priority to U.S. Provisional Patent Application No. 63/323,013, filed on Mar. 23, 2022, the entire contents of which are incorporated herein by reference.

BACKGROUND

The present disclosure relates to a garden tool, such as a robotic lawn mower having a toolless wheel installation assembly.

SUMMARY

In one aspect, the disclosure provides a garden tool. The garden tool includes a deck, a motor, an implement configured to be driven by the motor, a wheel shaft, and a wheel removably coupled to the wheel shaft by way of a toolless shaft nut assembly. The toolless shaft nut assembly configured to self-lock.

Alternatively or additionally, in any combination: the toolless shaft nut assembly may be configured to self-lock by way of a nut lock configured to engage a stop surface; the nut lock may include one or both of 1) a pawl or 2) a lock surface and wherein the stop surface is configured as one or both of 1) a toothed ratchet defining the stop surface or 2) a recess in the wheel shaft defining the stop surface; the nut lock may be biased into engagement with the stop surface and manually actuatable to move out of engagement with the stop surface; the toolless shaft nut assembly may be configured to be unlocked by one or both of 1) a movable link having internal threads and being configured to threadedly disengage from the wheel shaft or 2) a nut lock configured to be movable away from a stop surface with which the nut lock is otherwise configured to be engageable with; the toolless shaft nut assembly includes a nut lock, wherein the nut lock is manually movable between a locked position and an unlocked position, wherein in the locked position, the nut lock is configured to engage the wheel shaft, and in the unlocked position, the nut lock is configured to disengage from the wheel shaft such that the toolless shaft nut assembly is removable from the wheel shaft; the nut lock may be configured to slide between the locked and unlocked positions into and out of a recess in the wheel shaft; the toolless shaft nut assembly may further include internal threads configured to engage with external threads of the wheel shaft.

In another aspect, the disclosure provides a robotic lawn mower movable along a support surface. The robotic lawn mower includes a deck, a motor, a blade configured to be driven by the motor, a wheel shaft, and a wheel removably coupled to the wheel shaft by way of a toolless shaft nut assembly. The toolless shaft nut assembly is configured to self-lock.

Alternatively or additionally, in any combination: the toolless shaft nut assembly may be configured to be unlocked by one or both of 1) a movable link having internal threads and being configured to threadedly disengage from the wheel shaft or 2) a nut lock configured to be movable away from a stop surface with which the nut lock is otherwise configured to be engageable with; the toolless shaft nut assembly may include a nut lock configured to engage a stop surface; the nut lock may include one or both of 1) a pawl or 2) a lock surface and wherein the stop surface is configured as one or both of 1) a toothed ratchet defining the stop surface or 2) a recess in the wheel shaft defining the stop surface; a deck height of the deck with respect to the support surface may be adjustable by selecting the wheel from a plurality of wheels including a first wheel having a first diameter and a second wheel having a second diameter different from the first diameter, wherein the first diameter corresponds to a first deck height and the second diameter corresponds to a second deck height different from the first deck height.

In a further aspect, the disclosure provides a method of selecting a deck height of a garden tool with respect to a support surface on which the garden tool moves. The method includes selecting a wheel from a plurality of wheels including a first wheel having a first diameter and a second wheel having a second diameter different from the first diameter, wherein the first diameter corresponds to a first deck height and the second diameter corresponds to a second deck height different from the first deck height, installing the selected wheel on the garden tool by manually attaching a self-locking nut such that the selected wheel is secured without the use of a tool.

Alternatively or additionally, in any combination the method may include: attaching the self-locking nut may further include causing a nut lock to be engageable with a stop surface to provide the self-locking; removing the selected wheel from the garden tool by manually unlocking the self-locking nut; manually unlocking may include one or both of 1) causing a movable link to threadedly disengage from a wheel shaft or 2) moving a nut lock away from a stop surface with which the nut lock is otherwise configured to engage; moving the nut lock away from the stop surface may include pushing the nut lock; manually unlocking may include moving one or both of the movable link or the nut lock against a biasing force.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein are for the purpose of description and should not be regarded as limiting. The terms "approximately", "about", "generally", "substantially", and the like should be understood to mean within standard tolerances, as would be understood by one of ordinary skill in the art, unless specific tolerances are defined below.

Figure 1:
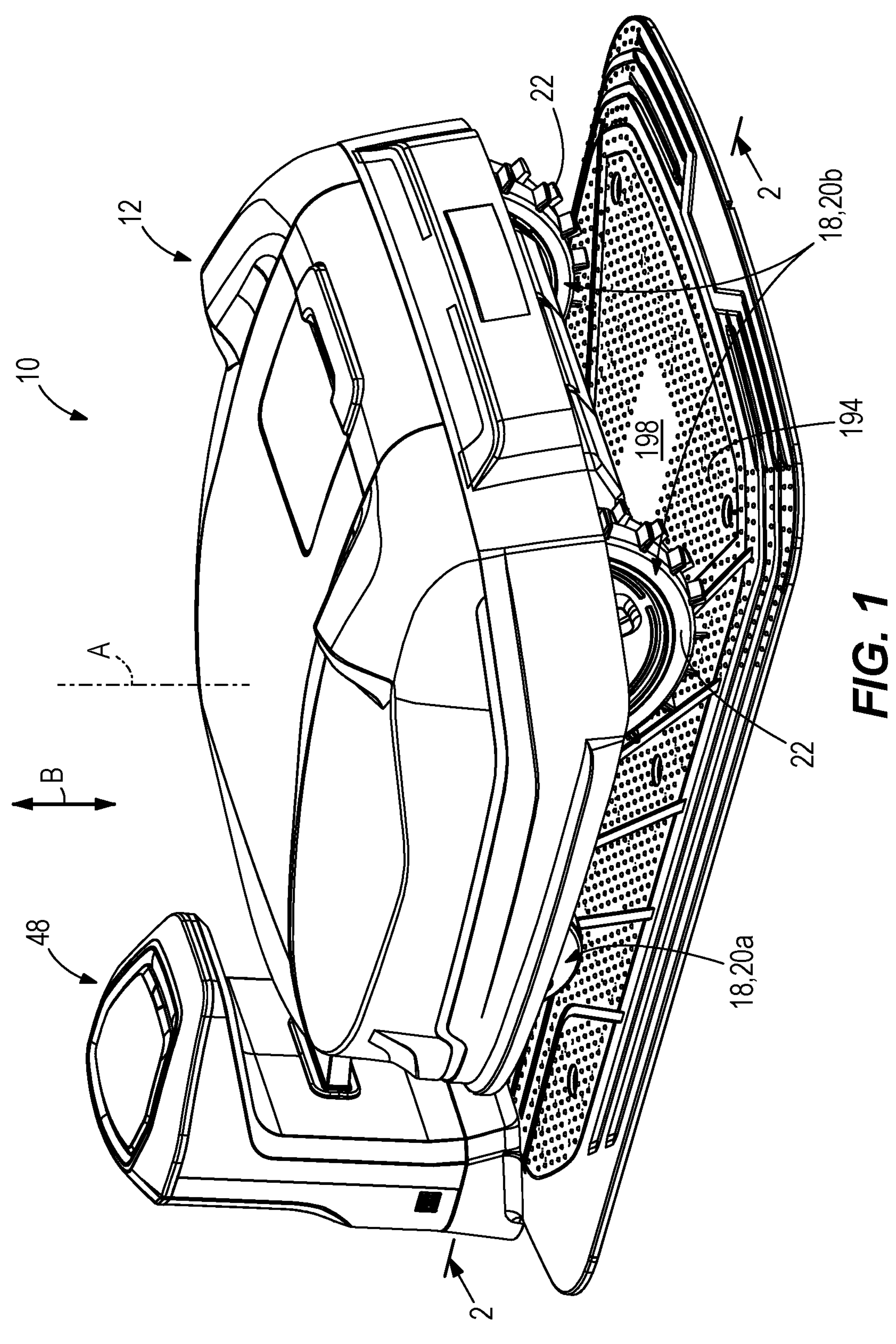
FIG. 1 is a top perspective view of an autonomous lawn mower embodying the disclosure.
Figure 2:
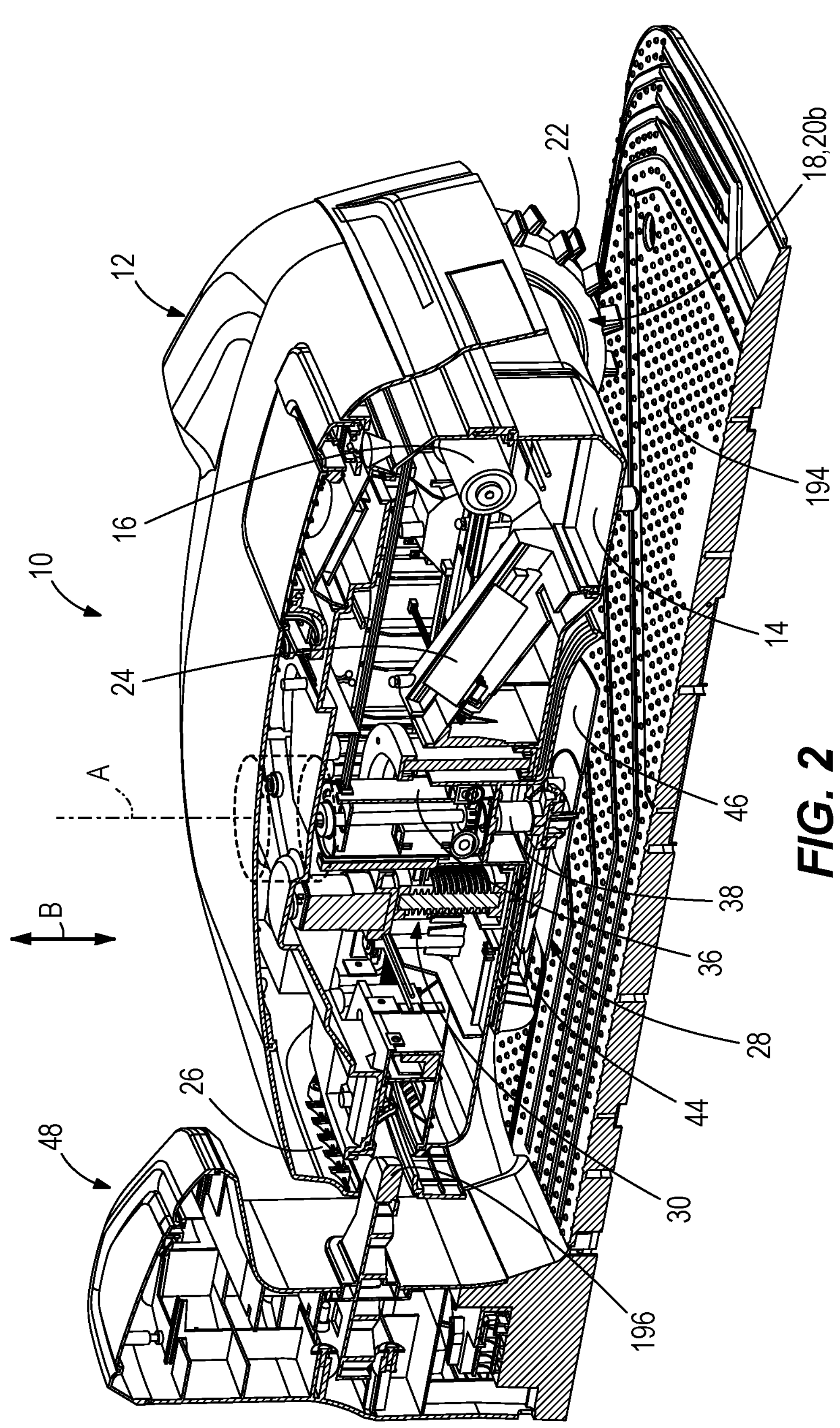
FIG. 2 is a cross-sectional view of the lawn mower of FIG. 1 taken through line 2-2 in FIG. 1.

FIGS. 1-2 illustrate a garden tool system 10. For example, the garden tool system 10 may include a garden tool 12, such as a lawn mower 12 (as shown), or in other implementations may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. For example, other implementations of the garden tool 12 may include a vacuum cleaner, a trimmer, a string trimmer, a hedge trimmer, a sweeper, a cutter, a plow, a blower, a snow blower, etc. In the illustrated implementation, the garden tool system 10 includes the lawn mower 12 and a charging station 48. The garden tool 12 may be autonomous, semi-autonomous, or not autonomous.

Figure 3:
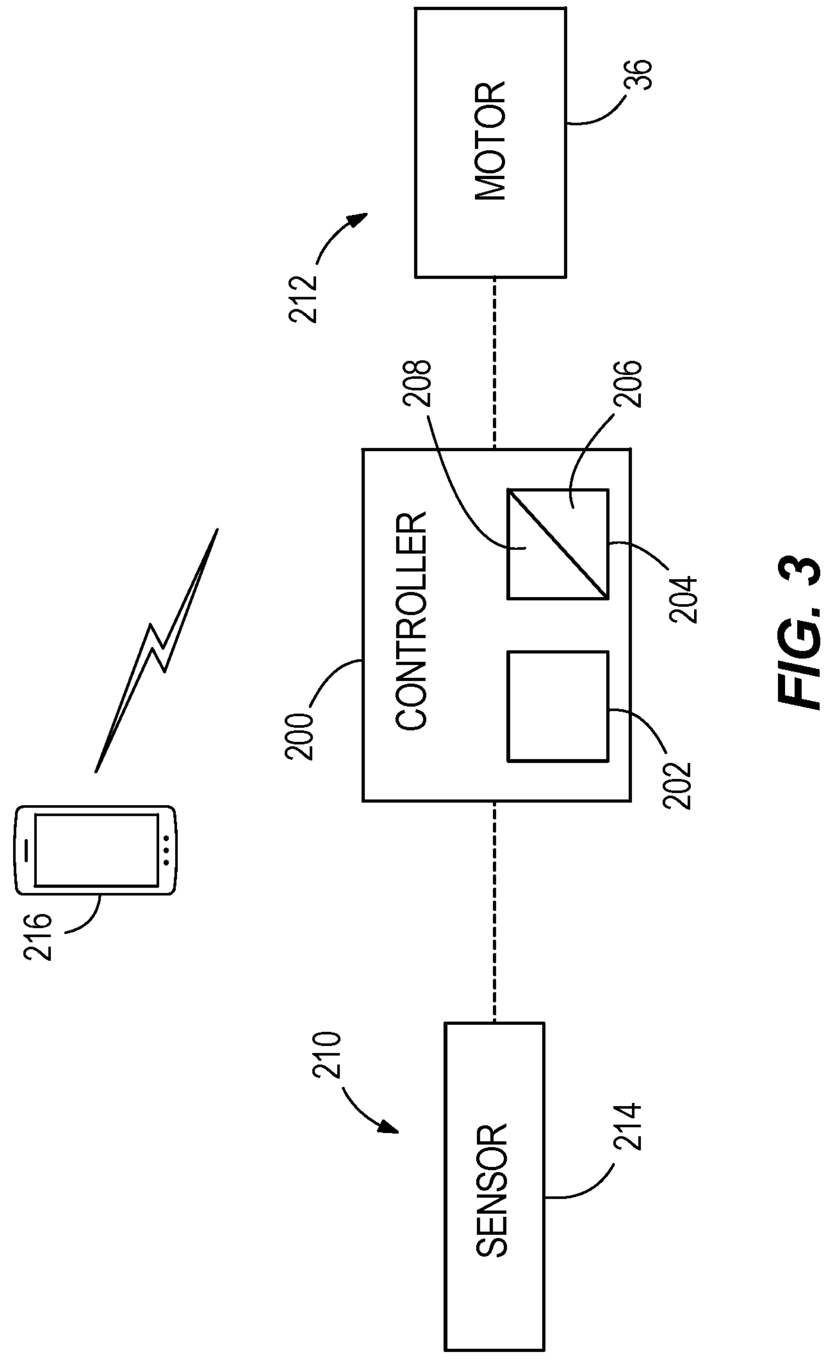
FIG. 3 is a schematic diagram illustrating a control system for the lawn mower of FIG. 1.

For example, as illustrated in FIG. 3, the lawn mower 12 may include a controller 200 having a programmable processor 202 (e.g., a microprocessor, a microcontroller, or another suitable programmable device), a memory 204, and a human-machine interface 216 (which may include a mobile device). The memory 204 may include, for example, a program storage area 206 and a data storage area 208. The program storage area 206 and the data storage area 208 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The controller 200 may also, or alternatively, include integrated circuits and/or analog devices, e.g., transistors, comparators, operational amplifiers, etc., to execute the logic and control signals described herein. The controller 200 includes a plurality of inputs 210 and outputs 212 to and from various components of the lawn mower 12. The controller 200 is configured to provide control signals to the outputs 212 and to receive data and/or signals (e.g., sensor data, user input signals, etc.) from the inputs 210. The inputs 210 and outputs 212 are in communication with the controller 200, e.g., by way of hard-wired and/or wireless communications such as by satellite, internet, mobile telecommunications technology, a frequency, a wavelength, Bluetooth®, or the like. The controller 200 may include a navigation system, which may include one or more of a global positioning system (GPS), beacons, sensors such as image sensors, ultrasonic sensors, wire sensors, and an algorithm for navigating an area to be mowed. However, in other implementations, the lawn mower 12 may be non-autonomous.

With reference to FIG. 2, the lawn mower 12 includes a deck 14 for supporting various components of the lawn mower 12, as will be described in greater detail below. The lawn mower 12 includes at least one prime mover 16 for providing tractive effort to move the lawn mower 12 across a support surface 32 (FIG. 16), such as the charging station 48 or a lawn to be mowed. The at least one prime mover 16 may be supported by the deck 14. For example, the at least one prime mover 16 may include one or more electric motors 16 in the illustrated implementation. However, in other implementations the prime mover 16 may include another type of motor, a gasoline engine, or the like, in any suitable quantity and combination.

The lawn mower 12 also includes a plurality of wheels 18 (FIG. 1), which may be supported by the deck (FIG. 2), for converting the tractive effort into motion of the lawn mower 12 on the support surface 32. Each of the plurality of wheels 18 supports a tire 22 in the illustrated implementation. In some implementations, the tire 22 may be formed integrally with the wheel 18. In other implementations, the plurality of wheels 18 may support any combination of one or more of tires, continuous tracks, or the like. The plurality of wheels 18 includes two front wheels **20*a* and two rear wheels 20*b*, but other quantities of wheels may be employed in other implementations. As will be described in greater detail below with respect to FIGS. 4-17, one, some, or all of the wheels 18 may be removable and interchangeable—for example, interchangeable with wheels having other sizes, as well as interchangeable with replacement wheels having any other desirable characteristic, such as a different tread pattern, or a new wheel to replace a worn wheel. In the illustrated implementation, each of the two rear wheels 20*b* is operatively coupled to its own prime mover 16 (such as two electric motors, one for each respective rear wheel 20*b*) to apply torque thereto, and the two front wheels 20*a*** are not driven. However, other torque-transmission arrangements can be used in other implementations with any quantity and combination of driven and non-driven wheels, any number of wheels being driven by a single prime mover, and any number of prime movers.

The lawn mower 12 includes a power source 24 (FIG. 2), such as a battery, for powering the at least one prime mover 16 such that the lawn mower 12 can perform a lawn mowing operation in a cordless fashion. The power source 24 may include one or more lithium-ion battery cells, and/or other battery chemistries. The power source 24 may be removable from the lawn mower 12. In other implementations, the at least one prime mover 16 may be powered by other power sources, such as solar panels, fuel cells, compressed fluid, fuel, or the like. The lawn mower 12 includes a battery charging contact 26 for receiving a charge from an external power source (not shown) for charging the power source 24.

With reference to FIGS. 1 and 2, the charging station 48 includes a docking pad 194 and a battery charging terminal 196. The docking pad 194 defines a generally planar surface 198, with "generally planar surface" being defined as providing enough of a portion of a planar surface, i.e., comprised of a single continuous surface or a plurality of separated (discontinuous) surfaces, for the lawn mower 12 to drive up onto and be supported by during a charging operation. The battery charging terminal 196 is configured to engage with the battery charging contact 26 on the lawn mower 12 to provide an electrical connection therebetween for charging the power source 24 (e.g., battery).

The lawn mower 12 includes a cutting module 30 (FIG. 2), which may be supported by the deck 14. The cutting module 30 includes a blade module 28 (which is one example herein of a driven implement) and a motor 36 configured to drive the blade module 28. In the illustrated implementation, the blade module 28 includes one or more blades 44, and the motor 36 drives the blade module 28 about an axis of rotation A. In other implementations, the blade module 28 includes a reciprocal trimming unit (not shown) having linearly reciprocating trimming blades, and the motor 36 drives the trimming blades of the trimming unit to move reciprocally. In yet other implementations, the blade module 28 includes a string (not shown), as in a string trimmer, and the motor 36 drives the string about the axis of rotation A. In yet other implementations, the blade module 28 includes a roller blade (not shown), such as a reel blade or squirrel cage blade, and the motor 36 drives the roller blade to roll or rotate about an axis that is generally parallel with the support surface 32 (e.g., generally horizontal). In yet other implementations, the blade module 28 includes an auger (not shown), such as snow blower auger, and the motor 36 drives the auger to roll or rotate about an axis that is generally parallel with the support surface 32 (e.g., generally horizontal). In yet other implementations, the blade module 28 includes a fan (not shown), such as a blower fan, and the motor 36 drives the fan in rotation. Other types of blades are possible in addition to the examples given above. Furthermore, other types of driven implements are also possible, including the blades above as well as other non-blade implements that are driven by the motor 36, such as brushes.

The motor 36 includes a rotatable drive shaft 38 operably coupled to the blade module 28 (or any other driven implement in accordance with any implementation of the disclosure). In the illustrated implementation, the drive shaft 38 is disposed coaxially with the axis of rotation A. In other implementations, the drive shaft 38 may be disposed parallel with (e.g., offset from) or transverse to the axis of rotation A. The axis of rotation A defines an axial direction B. The axial direction B is typically a vertical direction with respect to the support surface 32 on which the lawn mower 12 rides, e.g., up and down with respect to gravity, when the lawn mower 12 is in use. However, in certain implementations, the axis of rotation A (and thus the axial direction B) may be tilted relative to the vertical direction, for example by 1 to 10 degrees, preferably by 3 to 8 degrees, and more preferably by 5 to 6 degrees. In certain implementations, the axis of rotation A may be tilted forward in the travelling direction relative to the vertical direction.

The blade module 28 (FIG. 3) may include the one or more blades 44 supported by a blade holder 46. In the illustrated implementation, each of the one or more blades 44 is configured to cut vegetation, such as grass and other plants. In some implementations, each of the one or more blades 44 may include one or more strings for cutting vegetation. In yet other implementations, one or more blades 44 may include any other type of blade for cutting vegetation, such as a knife-edge cutter, a serrated cutter, a roller cutter, any of the cutters described above, or any other cutter. In yet other implementations, the blade holder 46 may support other types of blades, such as fan blades, an auger, etc. In yet other implementations, the blade holder 46 may be formed integrally with a blade or blades, a knife edge or edges, teeth, a string or strings, or any other cutter(s) in any combination.

Each of the plurality of wheels 18 may include a hub 51 having an inner wheel bracket 50 and an outer wheel bracket 52, the inner and outer wheel brackets 50, 52 configured to receive a wheel shaft 72. In other implementations, the inner wheel bracket 50 and the outer wheel bracket 52 may be integrated such that the hub 51 is formed as one piece.

The wheel shaft 72 defines a shaft axis C. The wheel 18 rotates about the shaft axis C. The hub 51 can be included on any combination of one or more of the front wheels **20*a* and the rear wheels 20*b***.

Figures 4, 5:
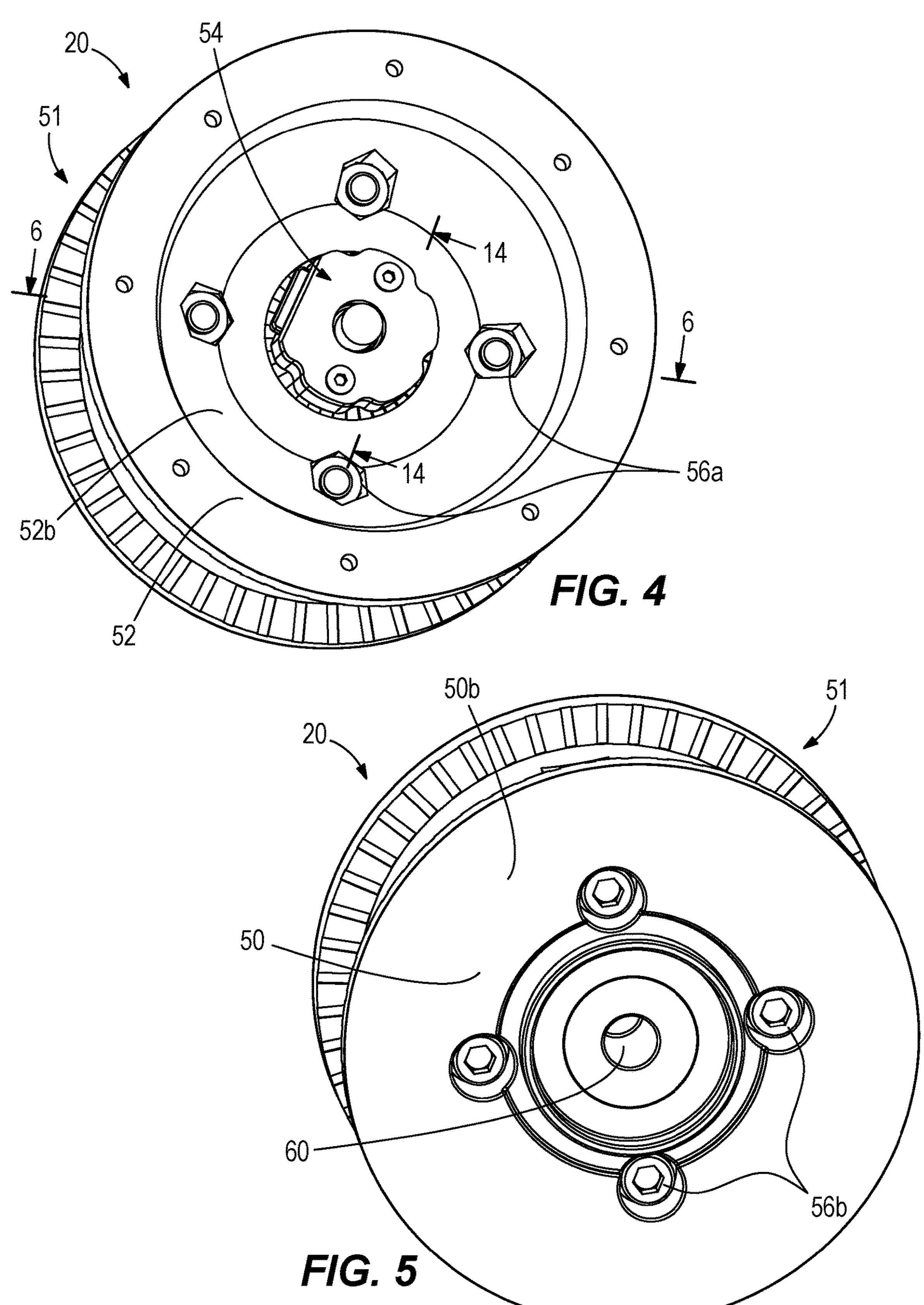
FIG. 4 is a front perspective view of a wheel of the lawn mower of FIG. 1.
FIG. 5 is a rear perspective view of the wheel of FIG. 4.
Figure 6:
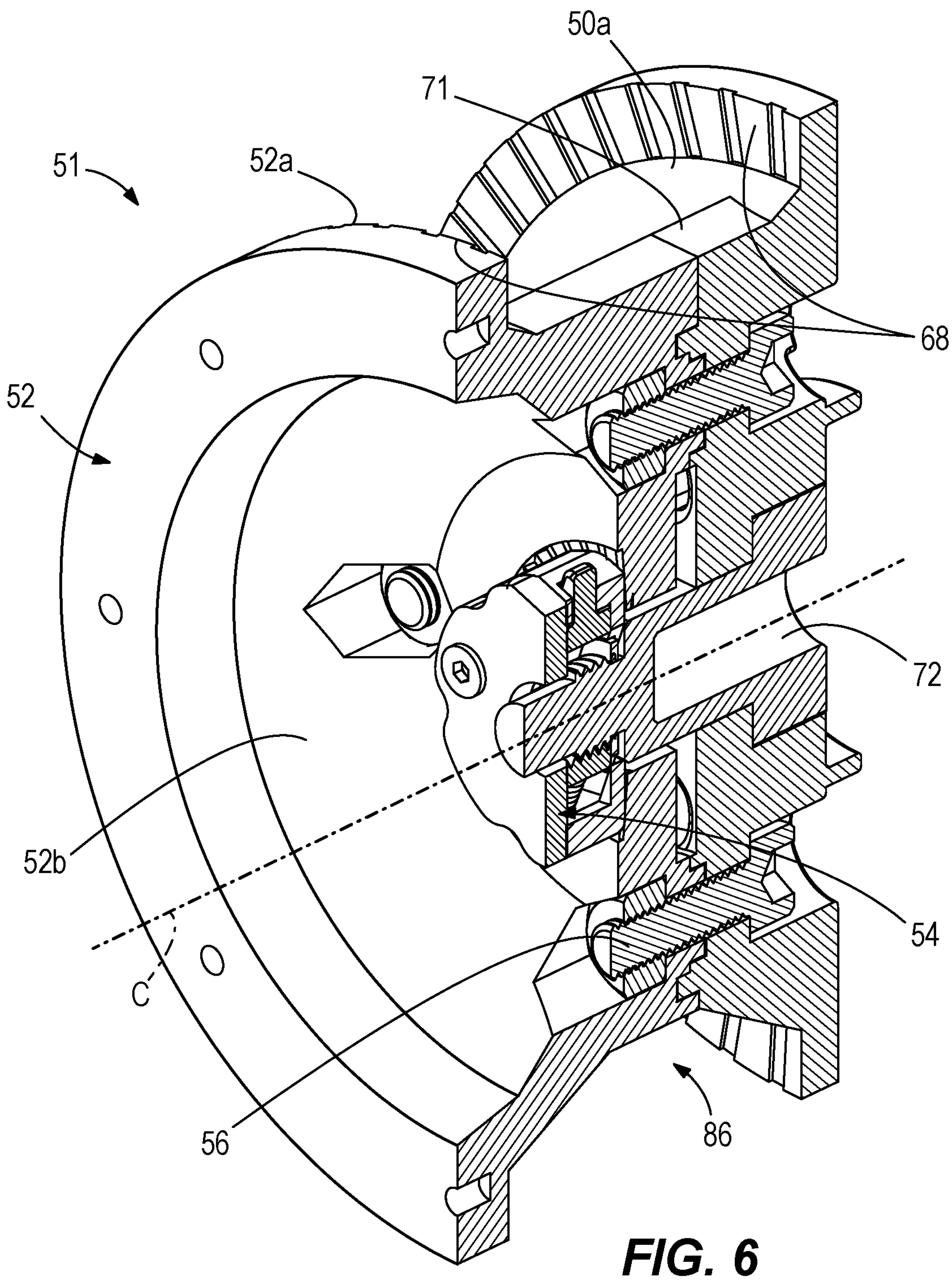
FIG. 6 is a perspective cross-sectional view of the wheel of FIGS. 4-5.
Figure 7:
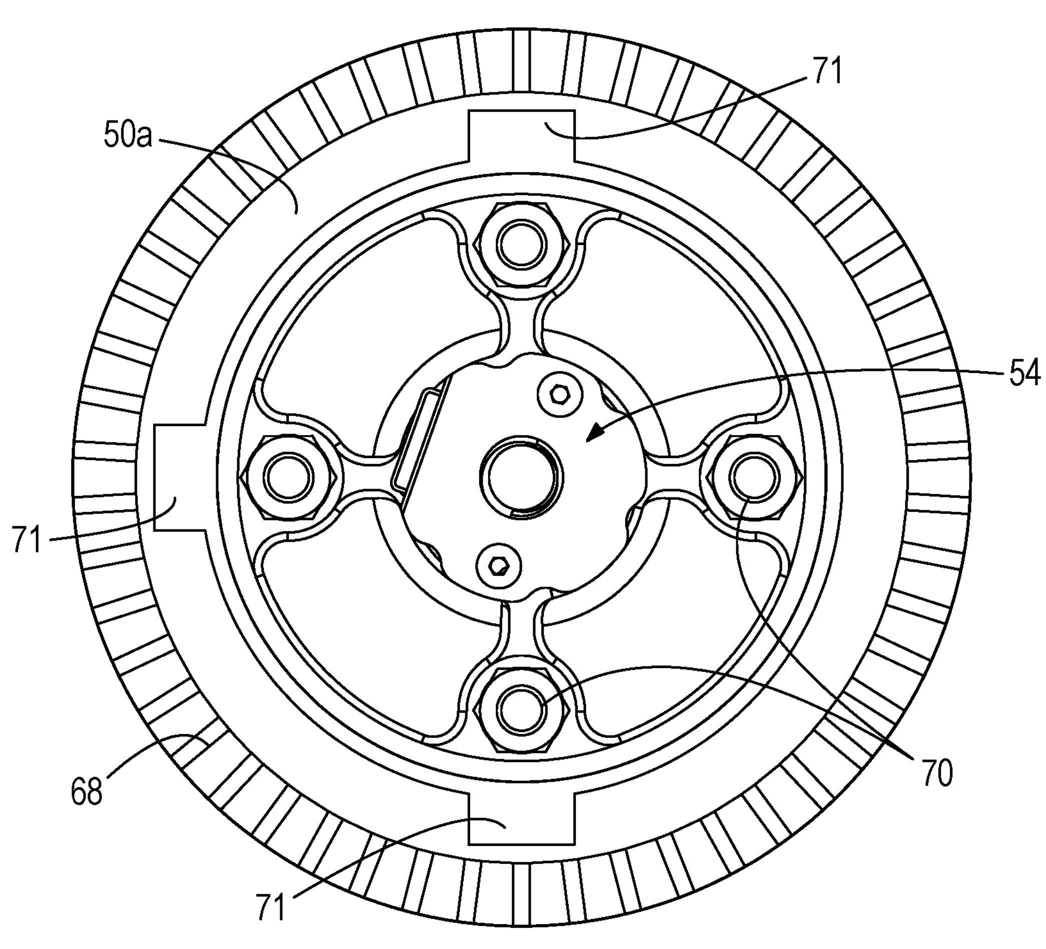
FIG. 7 is a front view of the wheel of FIG. 4 with the outer wheel bracket removed.
Figure 8:
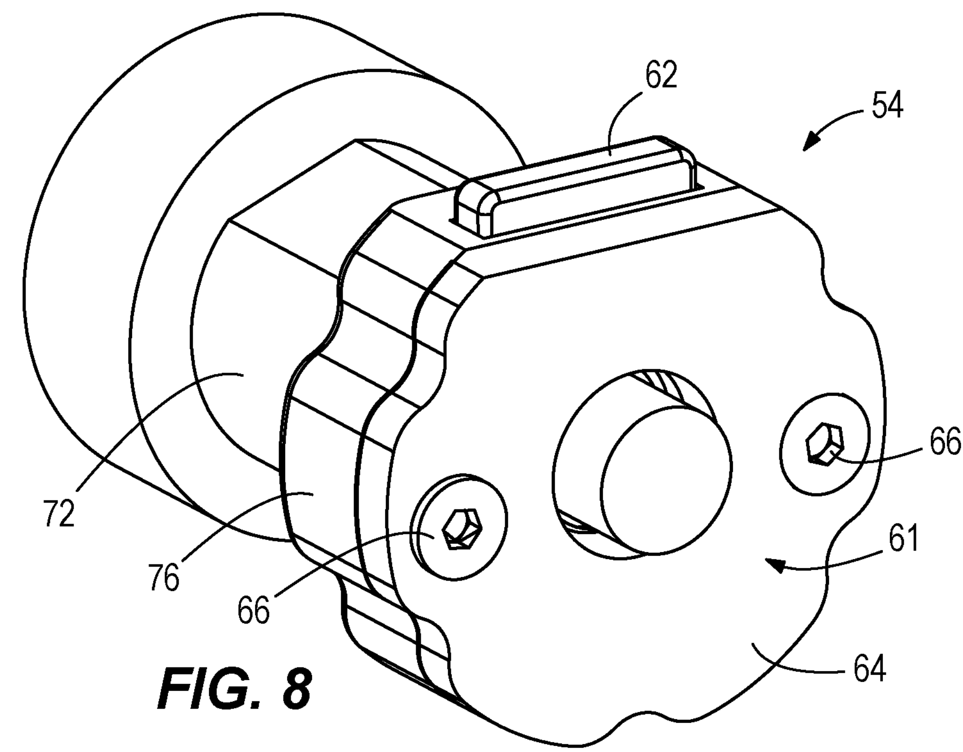
FIG. 8 is a perspective view of a toolless shaft nut assembly in a locked position.

The outer wheel bracket 52 (FIG. 4) is disposed on an outer side of the garden tool 12, farther away from the deck 14 than the inner wheel bracket 50. With reference to FIG. 4, the outer wheel bracket 52 may include a substantially planar outer face **52*b* that faces away from the deck 14 and an inner face 52*a* that faces towards the deck 14. The outer wheel bracket 52 includes through holes 56*a* that extend from the outer face 52*b* to the inner face 52*a*. In the illustrated implementation, there are four through holes 56*a*, though one, two, three, five, or more through holes 56*a* may be employed in other implementations. The through holes 56*a* may be sized to fit a fastener 70** such as a bolt or other suitable fastener, such as a screw, rivet, etc.

The inner wheel bracket 50 (FIG. 5) is disposed opposite of the outer wheel bracket 52, that is the inner wheel bracket 50 is disposed closer to the deck 14. The inner wheel bracket 50 may include a substantially planar outer face **50*b* that is faces towards the deck 14 and an inner face 50*a* that is faces away from the deck 14. The inner wheel bracket 50 may include through holes 56*b* that extend from the inner face 50*a* to the outer face 50*b*. The through holes 56*b* are aligned with the through holes 56*a* in the outer wheel bracket 52. In other implementations, the through holes 56*b* may be covered on the outer face 50*b* (e.g., with a removable cover, not shown) to inhibit debris, dust, and lawn clippings from entering the through holes 56*b*. The inner wheel bracket 50 also includes a shaft aperture 60. The shaft aperture 60 may be sized to receive a mid-section 72*b* (which may later be referred to herein as a second section 72*b*) of the wheel shaft 72. The shaft aperture 60 may be double D-shaped, having two straight edges; however, in other implementations, the shaft aperture 60** may be D-shaped (having one straight edge), I-shaped, C-shaped, star-shaped, polygonal shaped, keyed, or any other suitable shape for driving engagement with torque transmission.

The inner wheel bracket 50 and the outer wheel bracket 52 are secured to each other with the fasteners 70. The fasteners 70 are received in the through holes **56*a*, 56*b*. The number of fasteners 70 corresponds to the number of through holes 56*a*, 56*b* disposed on the outer wheel bracket 52 and the inner wheel bracket 50. When the inner wheel bracket 50 is secured to the outer wheel bracket 52, a recess 86 is defined between the inner wheel bracket 50 and the outer wheel bracket 52 and along a circumference of the inner and outer wheel brackets 50, 52. The tire 22 may be disposed in the recess 86. In other implementations, the tire 22 may be formed integrally with the hub 51**.

Additionally, the inner face 50*a* of the inner wheel bracket 50 and the inner face 52*a* of the outer wheel bracket 52 may include alignment lugs 71. The inner wheel bracket 50 and the outer wheel bracket 52 have the same number of alignment lugs 71. The alignment lugs 71 ensure that the outer wheel bracket 52 is correctly positioned and secured to the inner wheel bracket 50. In the illustrated implementation, there are three alignment lugs 71, however one, two, four, or more alignment lugs 71 may be employed. In other implementations, alignment markings could be used instead of alignment lugs 71.

A toolless shaft nut assembly 54, illustrated in FIGS. 8-15, is removably attachable to the wheel shaft 72 and is self-locking as will be described in greater detail below. The toolless shaft nut assembly 54 may also be referred to herein as a self-locking nut 54. The toolless shaft nut assembly 54 includes a housing 61, an actuator 62, a biasing member 74, and a movable link 78. In the illustrated implementation, the housing 61 includes a cover plate 64, fasteners 66, and a shaft nut body 76; however, other arrangements are possible, and some parts of the housing 61 may be integrated or divided without departing from the scope of the disclosure. The cover plate 64 is attached to the shaft nut body 76 by the fasteners 66. In the illustrated implementation, two fasteners 66 are employed, however one, three, or more could be employed in other implementations to secure the cover plate 64 to the shaft nut body 76. The cover plate 64 inhibits debris from entering the toolless shaft nut assembly 54. The term "nut" used herein is not limited to structures having an internal screw thread, though some implementations herein may employ an internal screw thread. In other implementations, a "nut" may include other shaft-fastening structures, such as but not limited to one or more non-threaded fasteners, anchors, clamps, ratchets, pins, collets, and the like.

Figure 9:
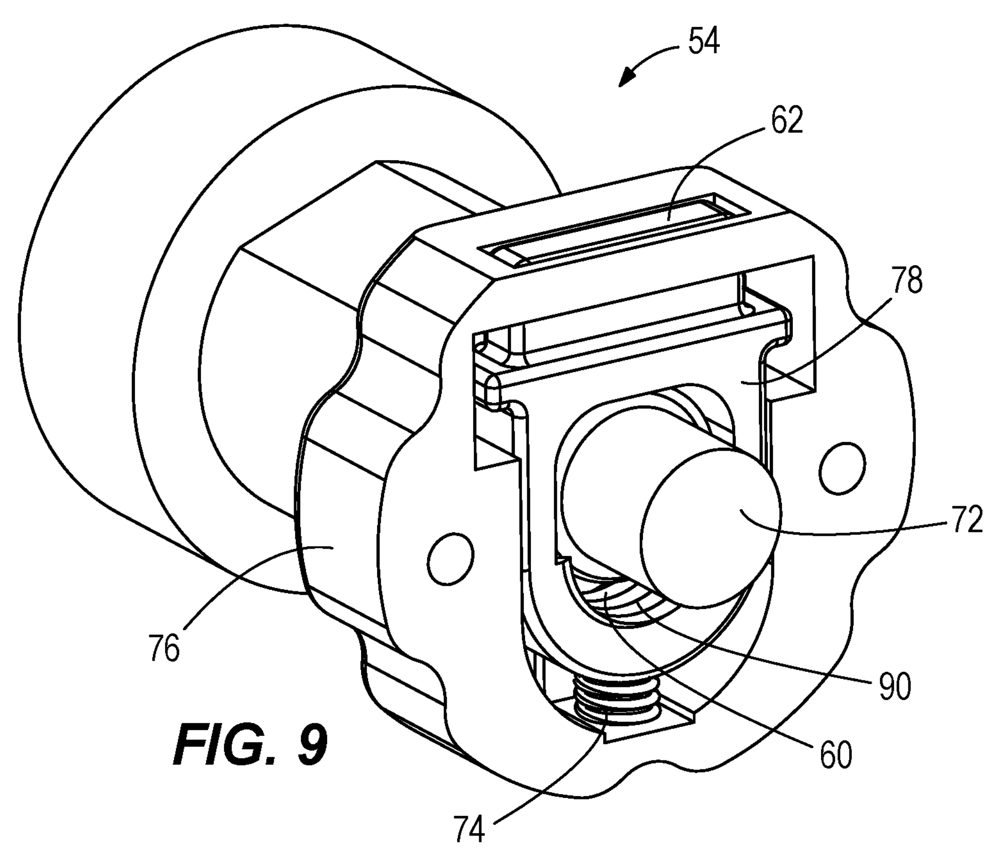
FIG. 9 is a perspective view of the toolless shaft nut assembly of FIG. 8 in an unlocked position.
Figure 10:
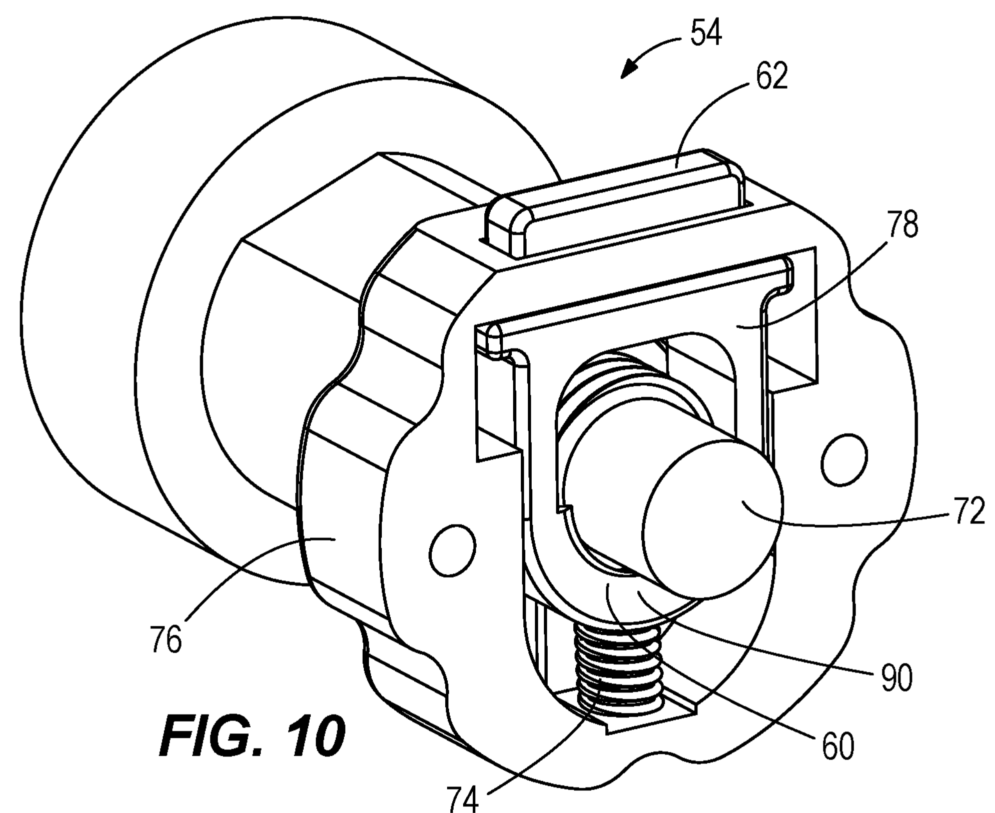
FIG. 10 is a perspective view of the toolless shaft nut assembly of FIG. 8, with the cover plate removed.

The actuator 62 is coupled to the movable link 78. In the illustrated implementation, the actuator 62 is formed as one piece with the movable link 78, though in other implementations the actuator 62 may be formed as a separate piece. The movable link 78 is partially disposed inside the shaft nut body 76 with the actuator 62 passing through the shaft nut body 76 and protruding from the outer surface of the shaft nut body 76. The movable link 78 includes a wheel shaft aperture 68 (FIG. 11) configured to receive the wheel shaft 72. The actuator 62 is manually actuatable to move as a unitary body with the movable link 78 between a locked position (FIG. 10) and an unlocked position (FIG. 9). The movable link 78 moves perpendicularly with respect to the shaft axis C between the locked position and the unlocked position. The movable link 78 further includes a set of internal threads 90 (FIG. 9) at least partially defining the wheel shaft aperture 68. Internal threads 90 may also be referred to herein as internal screw threads 90. In the unlocked position (FIG. 9), the internal threads 90 of the movable link 78 are not engaged with a set of external threads 88 that are disposed on a third section 72*c* of the wheel shaft 72. Thus, moving the movable link 78 to the unlocked position, i.e., manually unlocking, includes causing the movable link 78 to threadedly disengage from the wheel shaft 72. Additionally, in the unlocked position the toolless shaft nut assembly 54 may be able to be moved by the user along the shaft axis C. Said another way, when the movable link 78 is in the unlocked portion the toolless shaft nut assembly 54 may be attached to or removed from the wheel shaft 72. In the locked position, the internal threads 90 of the movable link 78 are engaged with the external threads 88 of the third section 72*c* of the shaft 72. In the locked position, the toolless shaft nut assembly 54 is threadedly engaged with the wheel shaft 72 and cannot be pulled on or off of the wheel shaft 72, though the toolless shaft nut assembly 54 can be rotated in threaded engagement with the wheel shaft 72 in a manner that will be described in greater detail below.

The biasing member 74 is disposed opposite of the actuator 62 and between the movable link 78 and the shaft nut body 76. The biasing member 74 biases the movable link 78 towards the locked position.

Figures 11, 12:
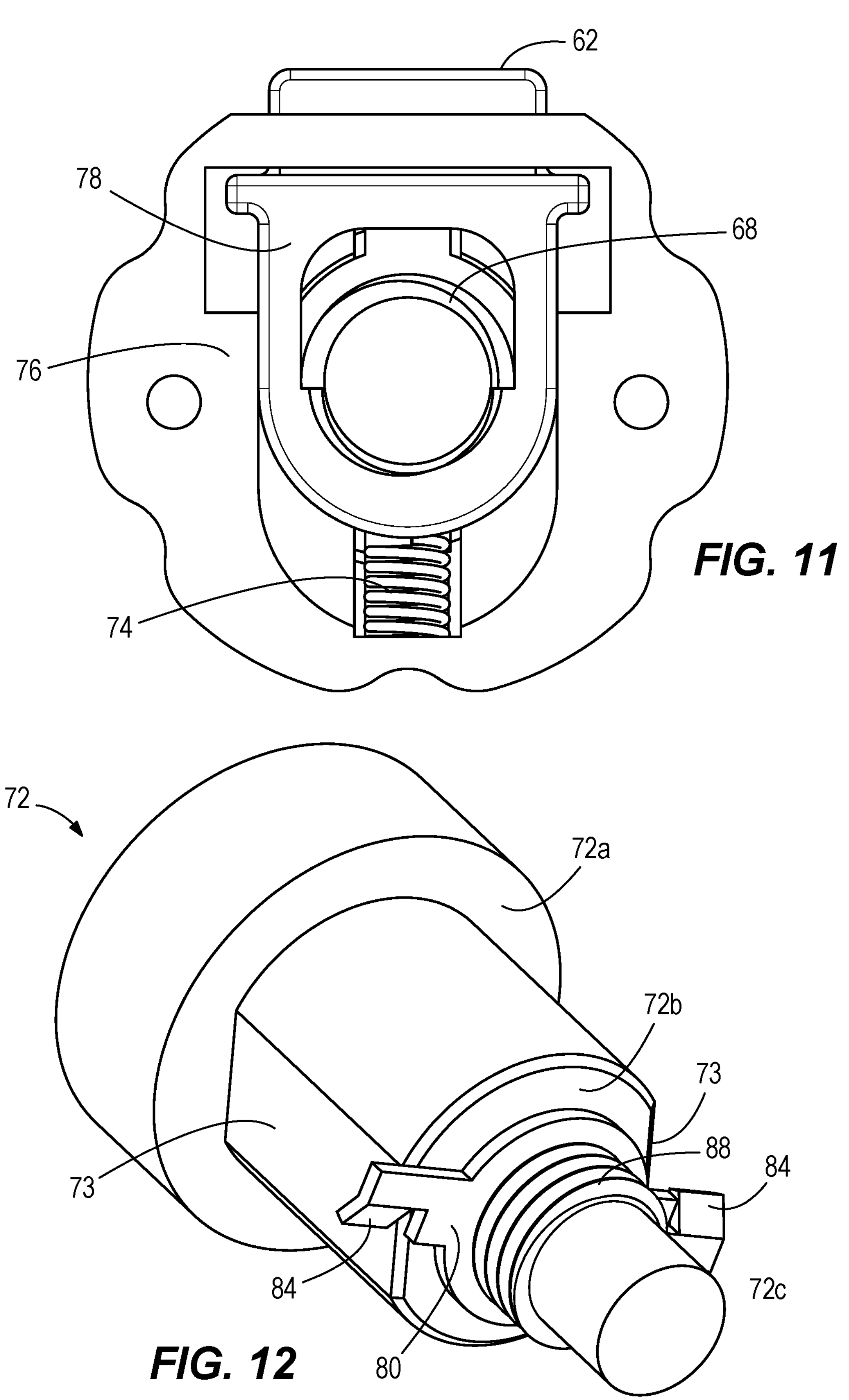
FIG. 11 is a front view of the toolless shaft nut assembly of FIG. 10.
FIG. 12 is a perspective view of a portion of the toolless shaft nut assembly of FIG. 10.
Figure 13:
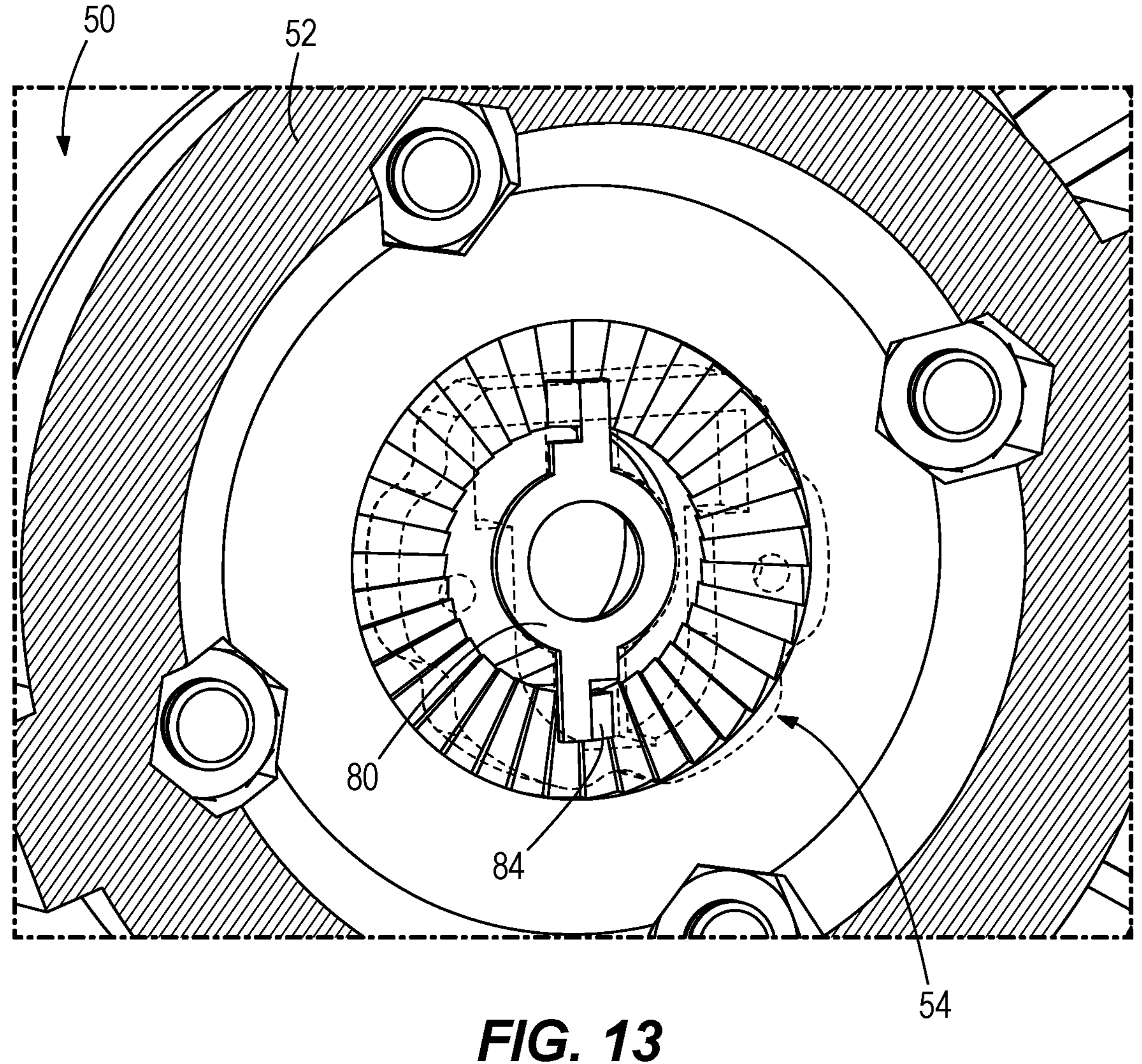
FIG. 13 is a front view of a nut lock with a portion of the toolless shaft nut assembly being shown as transparent.
Figure 14:
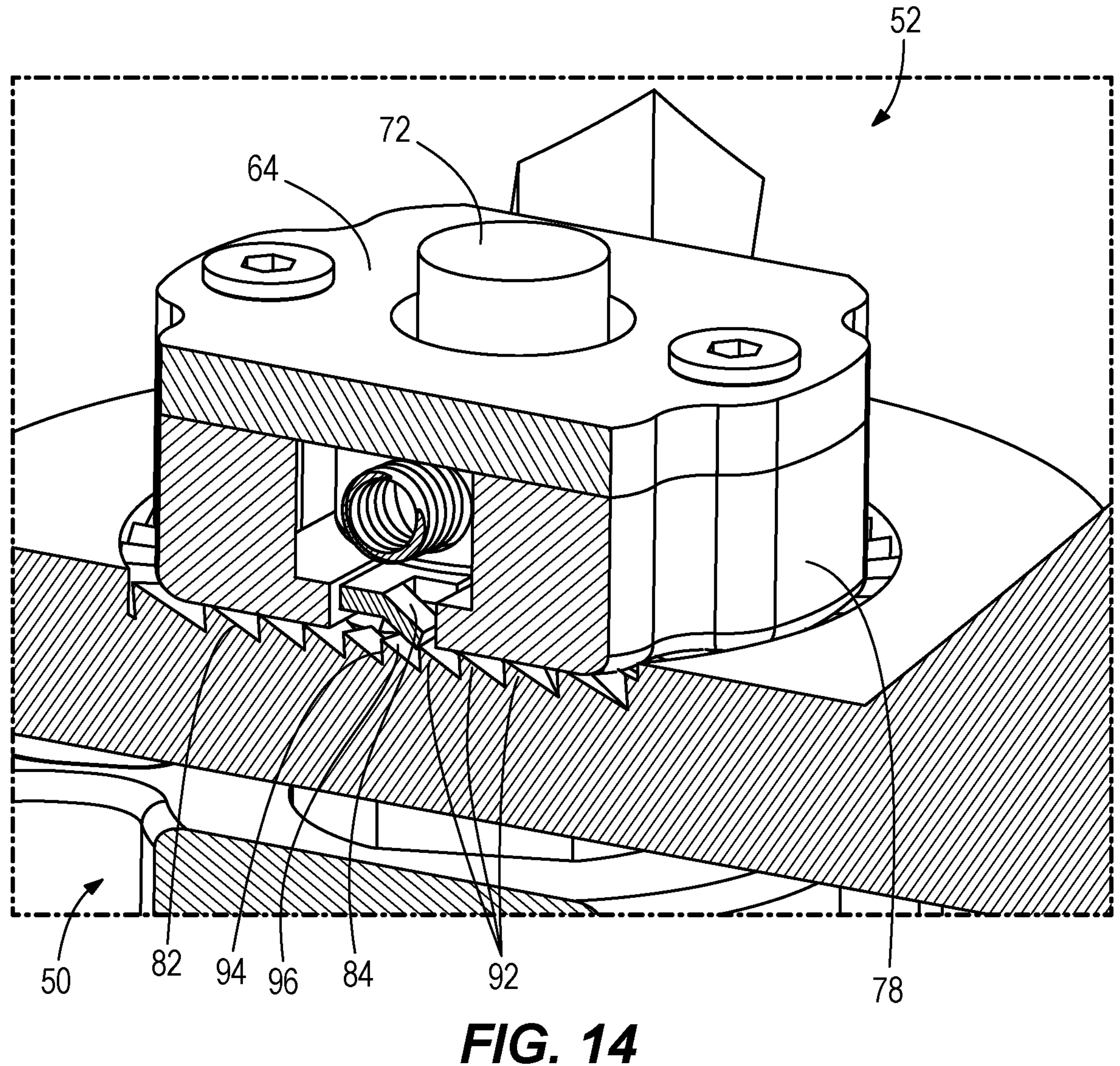
FIG. 14 is a perspective cross-sectional view of the toolless shaft nut assembly showing the nut lock.
Figure 15:
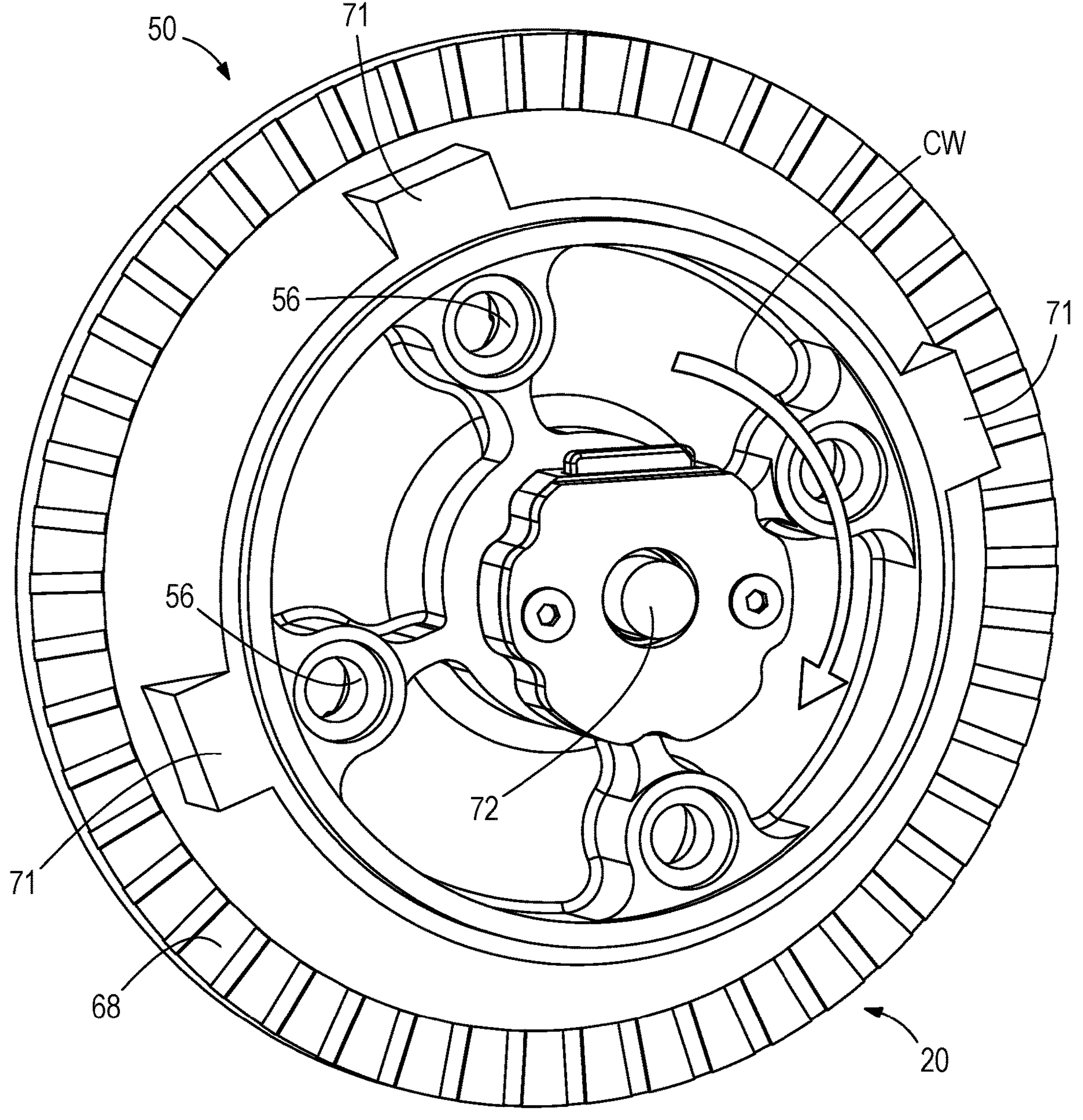
FIG. 15 is a perspective view of the wheel assembly of FIG. 8, where the toolless shaft nut assembly is being tightened.

With reference to FIG. 12, the wheel shaft 72 may include a pair of flats 73, a first section 72*a*, the second section 72*b*, and the third section 72*c*. The first section 72*a* of the wheel shaft 72 may be double D-shaped and have the pair of flats 73 extending along the second section 72*b*. However, in other implementations, the first section 72*a* may be D-shaped (having one flat 73), I-shaped, C-shaped, star-shaped, polygonal shaped, keyed, or any other suitable shape for driving engagement with torque transmission. The pair of flats 73 may engage with the flat surfaces defining the shaft aperture 60 of the inner wheel bracket 50. This double D-shape inhibits the wheel shaft 72 from freely rotating about the shaft axis C within the shaft aperture 60 of the inner wheel bracket 50 and provides a driving engagement for torque transmission. The first section 72*a* may have a larger diameter than the second section 72*b*, while the second section 72*b* may have a larger diameter than the third section 72*c*. The second section 72*b* of the wheel shaft 72 is receivable in the shaft aperture 60 of the inner wheel bracket 50. The first section 72*a* acts as a stop for the inner wheel bracket 50, limiting the axial movement of the inner wheel bracket 50 along the shaft axis C. The movable link 78 engages with the third section 72*c*. The second section 72*b* acts as a stop for the movable link 78. The second section 72*b* limits the axial movement of the toolless shaft nut assembly 54 along the shaft axis C.

The toolless shaft nut assembly 54 further includes a nut lock 80. The nut lock 80, shown in FIGS. 13-14, may be sized to receive the third section 72*c* of the of the wheel shaft 72. The nut lock 80 may be disposed between the second section 72*b* of the wheel shaft 72 and the shaft nut body 76. The nut lock 80 includes one or more pawls 84, which may be configured as a cantilevered resilient projection or any other suitable flexible projection. While two pawls 84 are employed in the illustrated implementation, it should be understood that one, three, or more pawls 84 may be employed in other implementations. One of the pawls 84 will be described in greater detail below, though it should be understood that the description applies to each of the pawls 84. The pawl 84 extends from the nut lock 80 at an angle and engages with a toothed ratchet surface 82 of the hub 51. The toothed ratchet surface 82 is formed as one piece on the outer wheel bracket 52 in the illustrated implementation, but may be formed on any other surface of the wheel 18 (such as the inner wheel bracket 50), or on a separate piece, in other implementations. The toothed ratchet surface 82 includes a plurality of ratchet teeth 92. Each ratchet tooth 92 includes a steep side 94 and a shallow side 96. The pawl 84 is configured to allow rotation of the toolless shaft nut assembly 54 in a clockwise direction CW (FIG. 15) about the shaft axis C but inhibits rotation in a counterclockwise direction, which is opposite the clockwise direction CW about the shaft axis C. The pawl 84 is configured to freewheel across the shallow sides 96 of the ratchet teeth 92 of the toothed ratchet surface 82 when the toolless shaft nut assembly 54 is rotated in the clockwise direction CW. The pawl 84 engages the steep side 94 of an adjacent ratchet tooth 92 to inhibit rotation in the counterclockwise direction. Thus, the steep side 94 may also be referred to herein as a stop surface 94 because engagement of the nut lock 80 with the stop surface 94 inhibits the toolless shaft nut assembly 54 from being removed from (or falling off of) the wheel shaft 72, e.g., due to vibrations or other forces that act to loosen the toolless shaft nut assembly 54 by acting to unthread the toolless shaft nut assembly 54 from the wheel shaft 72 when the user is not actively unlocking the toolless shaft nut assembly 54. Thus, the pawl 84 allows the toolless shaft nut assembly 54 to be manually tightened by allowing the toolless shaft nut assembly 54 to rotate in the clockwise direction about the shaft axis C, but inhibits the toolless shaft nut assembly 54 from being loosened by inhibiting the toolless shaft nut assembly 54 from rotating in the counterclockwise direction about the shaft axis C. The nut lock 80 is configured to be movable away from the stop surface 94 (e.g., during clockwise rotation) with which the nut lock 80 is otherwise (e.g., during counterclockwise rotation) configured to be engageable with. Thus, the toolless shaft nut assembly 54 is self-locking.

FIGS. 16-19 illustrate another implementation of a toolless shaft nut assembly 54' for a wheel 18'. Like parts are labeled with like reference numerals followed by "'" and any description of like parts herein may apply to either implementation interchangeably and in any combination. As such, like parts need not be described again. Furthermore, it should be understood that the wheel 18' may support the tire 22 shown in FIG. 2.

Figure 16:
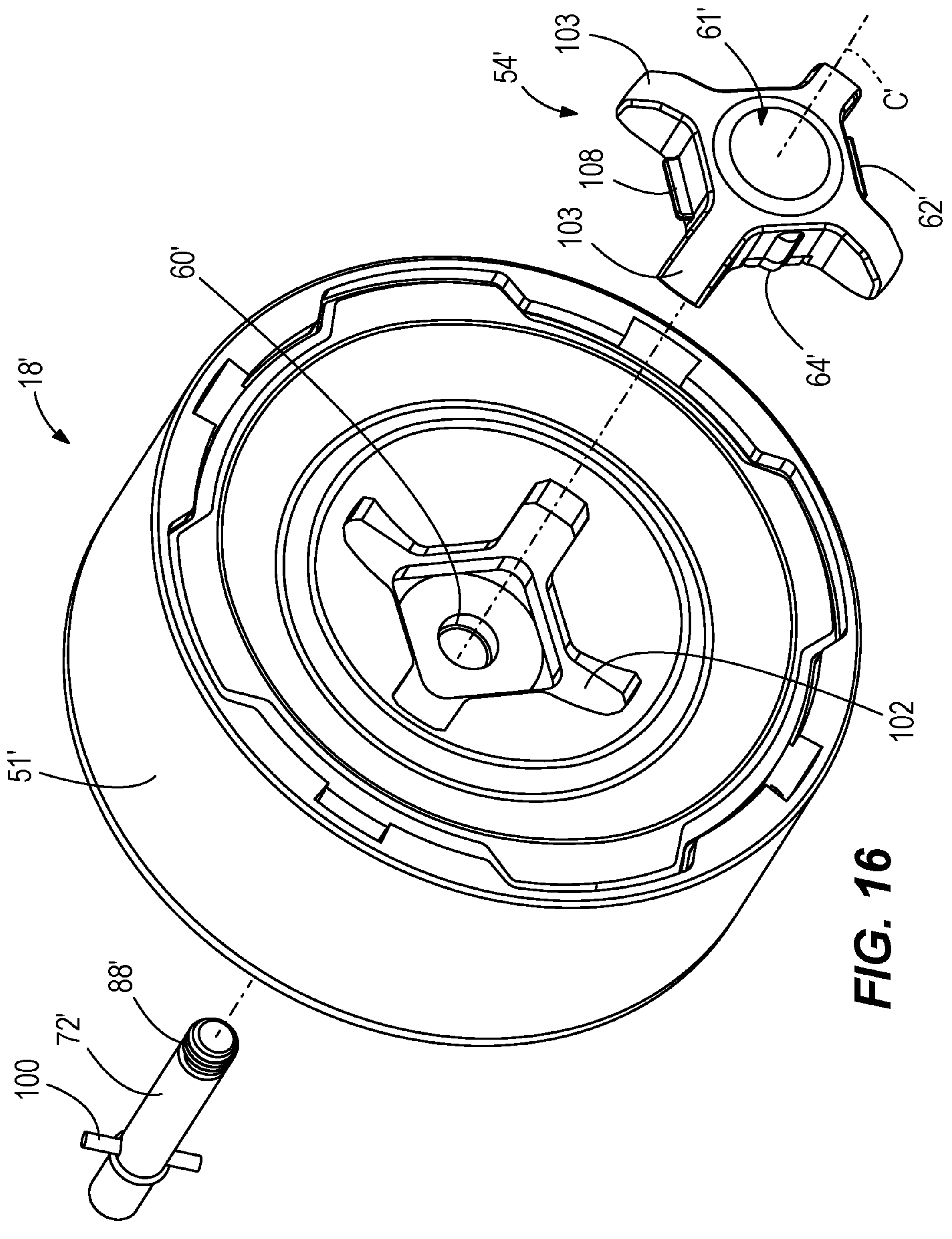
FIG. 16 is an exploded perspective view of another implementation of a toolless shaft nut assembly for a wheel of the lawn mower of FIG. 1.

FIG. 16 is an exploded view illustrating the toolless shaft nut assembly 54', a hub 51' of the wheel 18', and a wheel shaft 72'. The wheel shaft 72' includes a torque pin 100 extending therethrough and protruding radially therefrom. When the wheel shaft 72' is received in the shaft aperture 60' in the hub 51, the torque pin 100 is disposed in a channel 101 (FIG. 19) in the hub 51', transverse to the shaft aperture 60', to drivingly mate with the hub 51' such that torque is transmitted from the wheel shaft 72' to the wheel 18'. The torque pin 100 is received in the channel 101 at a rear of the wheel 18' such that the wheel 18' may slide on an off the wheel shaft 72'. The toolless shaft nut assembly 54' engages the wheel shaft 72' at a front of the wheel 18'.

The wheel 18' may include a hub recess 102 in the front surface that is shaped to generally match and receive the toolless shaft nut assembly 54' in a recessed fashion. For example, the toolless shaft nut assembly 54' has a multi-lobular shape defined by two or more lobes 103 on the housing 61' (e.g., the shaft nut body 76') providing a grip for manual torque transmission, i.e., for a user to rotate the toolless shaft nut assembly 54' by hand. The hub recess 102 also generally has the multi-lobular shape.

Figure 17:
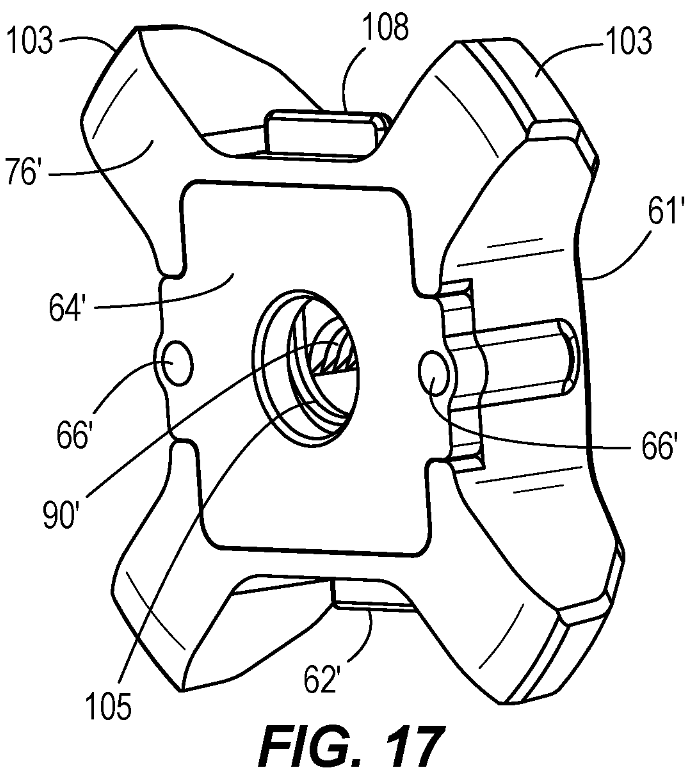
FIG. 17 is a rear perspective view of the toolless shaft nut assembly of FIG. 16.

FIG. 17 illustrates a rear of the toolless shaft nut assembly 54' including a cover plate 64' coupled to the shaft nut body 76' by way of fasteners 66'.

Figure 18:
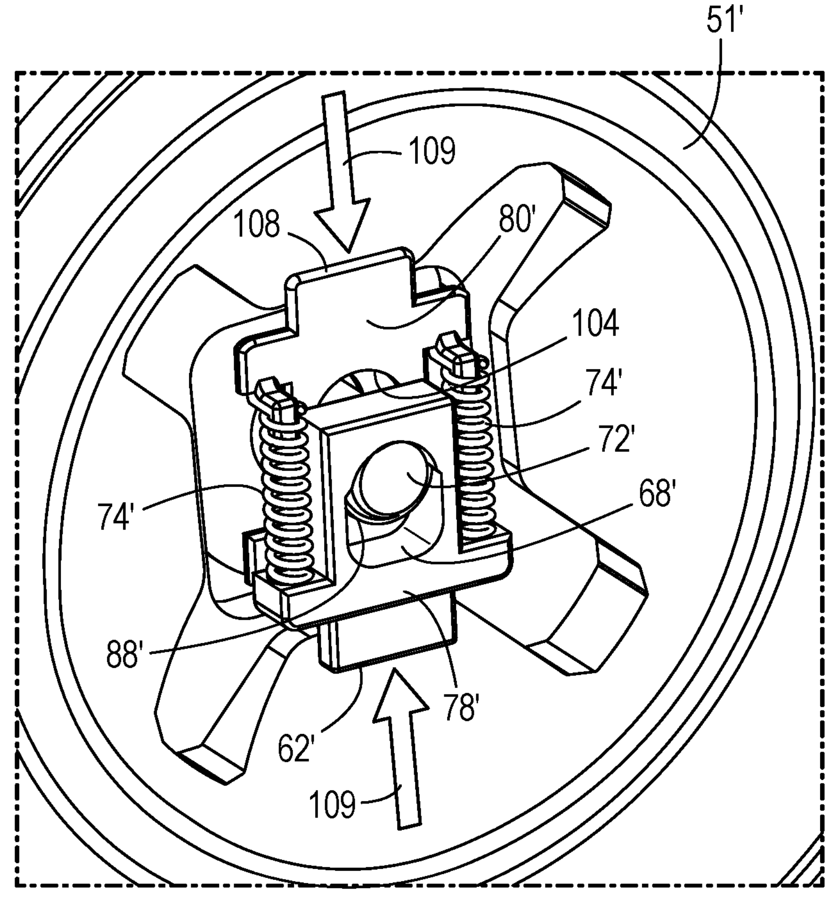
FIG. 18 is an enlarged view of a portion of the toolless shaft nut assembly and the wheel of FIG. 16 with the housing removed in order to illustrate the inside of the toolless shaft nut assembly.
Figure 19:
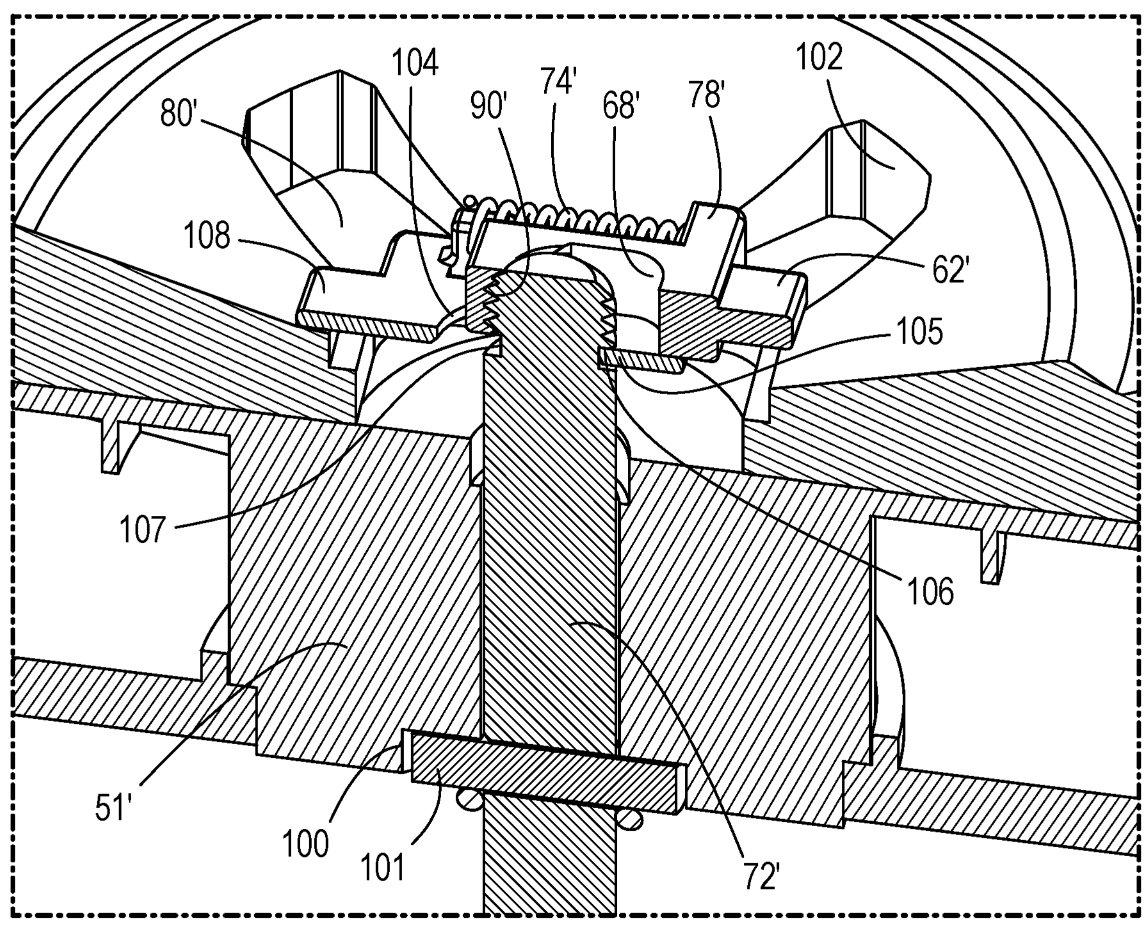
FIG. 19 is a cross-section view taken through the toolless shaft nut assembly and the wheel of FIG. 18.

As best illustrated in FIGS. 18-19, the toolless shaft nut assembly 54' includes a movable link 78' and a nut lock 80', both of which are movably mounted with respect to the housing 61'. In the illustrated implementation, an actuator 62' is formed as one piece with the movable link 78', though in other implementations the actuator 62' may be formed as a separate piece. The movable link 78' is partially disposed inside the shaft nut body 76' with the actuator 62' passing through the shaft nut body 76' and protruding from the outer surface of the shaft nut body 76'. The movable link 78' includes a wheel shaft aperture 68' configured to receive the wheel shaft 72'. The actuator 62' is manually actuatable to move as a unitary body with the movable link 78' between a locked position (FIGS. 18-19) and an unlocked position (embodying the same principle as shown and described with respect to the implementation of FIG. 9). The movable link 78' moves perpendicularly with respect to the shaft axis C' between the locked position and the unlocked position. The movable link 78' further includes a set of internal threads 90' at least partially defining the wheel shaft aperture 68'. In the unlocked position, the internal threads 90' of the movable link 78' are not engaged with the external threads 88' of the wheel shaft 72'. Thus, moving the movable link 78' to the unlocked position, i.e., manually unlocking, includes causing the movable link 78' to threadedly disengage from the wheel shaft 72'. Additionally, in the unlocked position the toolless shaft nut assembly 54' may be able to be moved by the user along the shaft axis C'. Said another way, when the movable link 78' is in the unlocked portion the toolless shaft nut assembly 54' may be attached to or removed from the wheel shaft 72'. In the locked position, the internal threads 90' of the movable link 78' are engaged with the external threads 88' of the wheel shaft 72'. In the locked position, the toolless shaft nut assembly 54' is threadedly engaged with the wheel shaft 72'. The toolless shaft nut assembly 54' can be rotated in threaded engagement with the wheel shaft 72, particularly for tightening the toolless shaft nut assembly 54' in a manner that will be described in greater detail below. The toolless shaft nut assembly 54' need not include the movable link 78'; in some implementations, the toolless shaft nut assembly 54' includes fixed internal threads that are not movable with respect to the housing 61'.

The toolless shaft nut assembly 54' includes a biasing member 74' disposed opposite the actuator 62' between the movable link 78' and the nut lock 80'. The biasing member 74' includes two biasing members 74' embodied as compression springs in the illustrated implementation; however, any suitable number and/or arrangement and/or type of biasing members may be employed. The biasing member 74' biases the movable link 78' towards the locked position.

The nut lock 80' is configured generally as a plate including an aperture 104 configured to receive the wheel shaft 72'. The nut lock 80' includes a lock surface 105 disposed adjacent the aperture 104, the lock surface 105 configured to engage a stop surface 106 to lock the toolless shaft nut assembly 54' on the wheel shaft 72'. Engagement between the lock surface 105 and the stop surface 106 limits the movement of the toolless shaft nut assembly 54' in the direction of the shaft axis C' to inhibit the toolless shaft nut assembly 54' from completely unthreading off the wheel shaft 72'. The stop surface 106 may be defined in the wheel shaft 72', e.g., by a recess 107; however, in other implementations the stop surface 106 may be defined in or by any other suitable structure. The recess 107 may be embodied as a circumferential groove which may be fully annular or partially annular, or may be embodied as a notch.

In the illustrated implementation, an actuator 108 is formed as one piece with the nut lock 80', though in other implementations the actuator 108 may be formed as a separate piece. The nut lock 80' is partially disposed inside the shaft nut body 76' with the actuator 108 passing through the shaft nut body 76' and protruding from the outer surface of the shaft nut body 76'. The actuator 108 is manually actuatable to move as a unitary body with the nut lock 80' between a locked position (FIGS. 18-19) and an unlocked position (embodying the same principle as shown and described with respect to the implementation of FIG. 9). The nut lock 80' moves perpendicularly with respect to the shaft axis C' between the locked position and the unlocked position. In the unlocked position, the lock surface 105 of the nut lock 80' is not received in the recess 107 the wheel shaft 72'. Additionally, in the unlocked position the toolless shaft nut assembly 54' may be able to be moved by the user along the shaft axis C'. Said another way, when the nut lock 80' is in the unlocked portion the toolless shaft nut assembly 54' may be attached to or removed from the wheel shaft 72'. Manually unlocking, e.g., moving the nut lock 80' from the locked position to the unlocked position by manually pushing the actuator 108 as shown by the arrow 109 in FIG. 18, includes moving the nut lock 80' away from the stop surface 106 with which the nut lock 80' is otherwise (e.g., in the locked position) configured to engage. Moving the nut lock 80' may include pushing and sliding as shown in the illustrated implementation, but may include other motions in other implementations, such as rotating, rocking, pivoting, etc. In the locked position, the lock surface 105 of the nut lock 80' is received in the recess 107 of the wheel shaft 72'. In the locked position, the toolless shaft nut assembly 54' is inhibited from being threaded completely off of the wheel shaft 72'. The toolless shaft nut assembly 54' can be manually rotated in threaded engagement with the wheel shaft 72' in the locked position, particularly for tightening the toolless shaft nut assembly 54' in a manner that will be described in greater detail below, but is inhibited from loosening completely off the wheel shaft 72' in the locked position.

The nut lock 80' is coupled to the movable link 78' by way of the biasing member 74'. Specifically, the nut lock 80' and the movable link 78' are arranged diametrically opposed with each other about the wheel shaft 72'. The biasing member 74' biases the actuators 62', 108 away from each other and, simultaneously, biases the internal threads 90' and the lock surface 105 towards the wheel shaft 72'. The actuators 62', 108 are squeezable inwards towards each other by a user, manually, as illustrated by arrows 109 in FIG. 18, against the bias of the biasing member 74'.

Figures 20, 21:
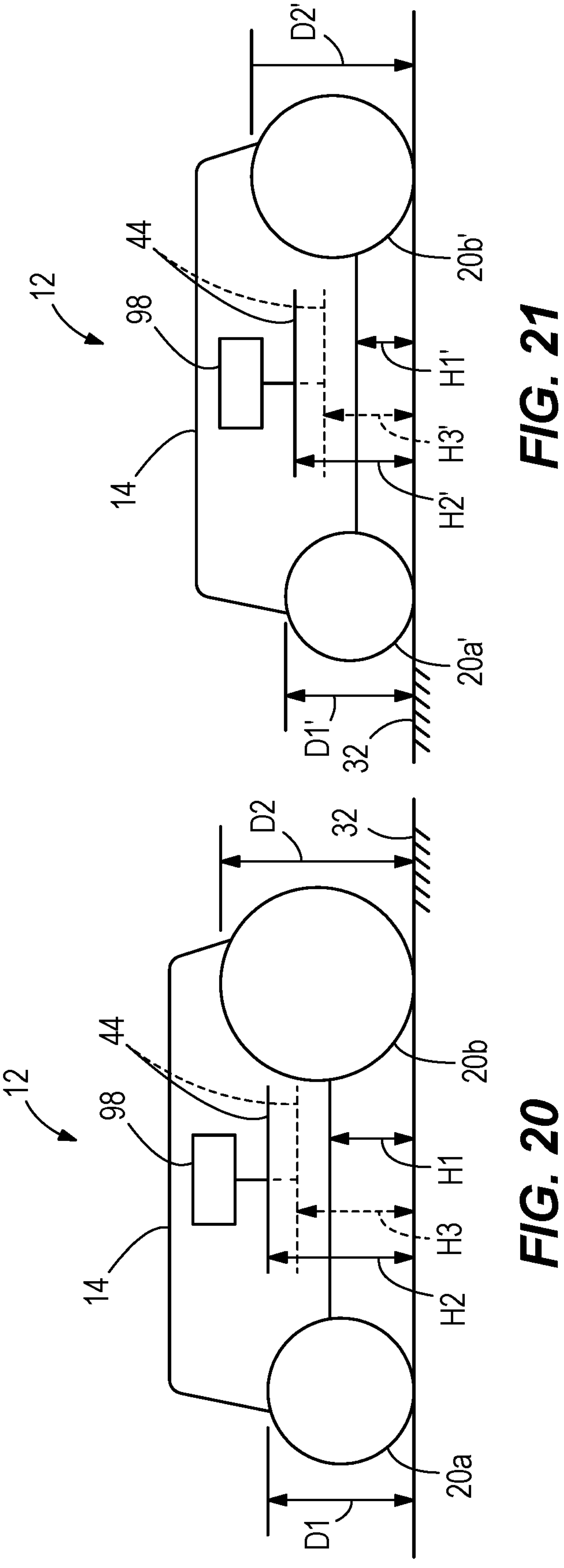
FIGS. 20-21 are a schematic illustration of the lawn mower of FIG. 1 with interchangeable wheels.

FIGS. 20-21 schematically illustrate interchangeable wheels having different characteristics being coupled to the deck 14. In FIG. 20, the wheels 20*a*, 20*b* coupled to the deck 14 have first diameters D1, D2 (respectively). In FIG. 21, different wheels 20*a*', 20*b*' are coupled to the deck 14 and have second diameters D1', D2' (respectively). The second diameter D1', D2' is smaller than the first diameter D1, D2. Thus, the characteristic is the diameter. However, in other implementations, the characteristic may be any other wheel characteristic, such as tire tread, age, level of wear, color, indicia, material, width, size, weight, etc.

The ability to install wheels having different sizes (e.g., diameters) may be desirable in order to change the deck height H1, H1', which may be defined as the smallest distance between the deck 14 and the support surface 32. The diameter D1 and/or D2 corresponds to the deck height H1, and the diameter D1' and/or D2' corresponds to the deck height H1'. As illustrated, the deck height H1 is greater than the deck height H1'. The ability to control the deck height H1, H1' by changing the wheels 18, 18' provides some control of a cutting height of the blade 44 since the blade height is also directly affected by changing the size of the wheels 18, 18'. In other implementations, some of the wheels 18, 18' (e.g., the rear wheels 20*b*) may be interchangeable and some others of the wheels 18, 18' (e.g., the front wheels 20*a*) may be height adjustable by other means. The wheels 20*a*, 20*b*, 20*a*', 20*b*' are each removably coupled with respect to the deck 14 by way of the toolless shaft nut assembly 54, 54'.

The garden tool 12 may also include a blade height adjustment mechanism 98 that adjusts the height of the blade 44. The cutting height H2, H2', H3, H3' may be defined as the smallest distance between the blade 44 and the support surface 32. In addition, installation of different-diameter wheels allows the range of cutting heights (H2 to H3, and H2' to H3') to be controlled. For example, the larger wheels 20*a*, 20*b* installed in FIG. 20 provide a first range of cutting heights H2-H3, and the smaller wheels 20*a*', 20*b*' installed in FIG. 21 provide a second range of cutting heights H2'-H3'. The first range of cutting heights H2-H3 is higher off the ground 32 than the second range of cutting heights H2'-H3'. In the illustrated implementation of FIGS. 20 and 21, the blade 44 is movable about 1.57 inches (40 mm) in the axial direction B between a raised position (see the blade 44 in solid lines) in which the blade 44 is fully raised and a lowered position (see the blade 44 in broken lines) in which the blade 44 is fully lowered. The blade 44 is movable at least 1.5 inches (38.1 mm) in the axial direction B in some implementations, and may be movable at least 1.57 inches (40 mm), and may be movable more than 1.57 inches (40 mm) in the axial direction B in some implementations. With reference to FIG. 20, the lowest cutting height H3 is about 1.96 inches (50 mm) off the ground 32 and the highest cutting height H2 is about 3.54 inches (90 mm) off the ground 32. As illustrated, the blade cutting height H2, H3 may be greater than the deck height H1 to ensure the blade 44 does not extend below the deck 14, though the blade 44 may extend below the deck 14 in some implementations. With reference to FIG. 21, the lower cutting height H3' is about 0.78 inches (20 mm) off the ground 32 and the highest cutting height H2' is about 2.36 inches (60 mm) off the ground 32.

Additionally, the ability to install wheels having different weights may be desirable to control the amount of traction force. As the wheel weight increases, the amount of traction force increases. Heavier wheels can allow the garden tool 12 to be used on softer or looser surfaces such as soil or gravel. Also, changing the weight of the wheels, can change the center of gravity of the garden tool 12. Changing the center of gravity of the garden tool 12 may be beneficial when a larger or smaller power source 24 is used with the garden tool 12 to inhibit the garden tool 12 from tipping or tilting, making the garden tool unusable.

In operation, the user may install and/or remove any one or more of the plurality of wheels 18, 18' to the wheel shaft 72, 72' of the garden tool 12 without the use of a hand tool or power tool such as but not limited to a screwdriver, a ratchet, a wrench, an impact driver, etc. The one or more of the plurality of wheels 18, 18' is installable and removable by hand using only the toolless shaft nut assembly 54, 54'. To install one of the plurality of wheels 18, 18' to the wheel shaft 72, 72', the user slides said one of the plurality of wheels 18, 18' onto the wheel shaft 72, 72'. Then, while squeezing the actuator 62 (or the actuators 62', 108), the user slides the toolless shaft nut assembly 54, 54' onto the wheel shaft 72, 72', which may, for example, include sliding until the toolless shaft nut assembly 54, 54' engages the one of the plurality of wheels 18, 18'. The user then releases the actuator 62 (or the actuators 62', 108) so that the internal threads 90, 90' of the movable link 78, 78' engage the external threads 88, 88' of the wheel shaft 72, 72' and/or so that the lock surface 105 of the nut lock 80' is received in the recess 107. Finally, the user can manually tighten the toolless shaft nut assembly 54, 54' by gripping the shaft nut body 76, 76' (e.g., at the two or more lobes 103) and rotating the toolless shaft nut assembly 54, 54' in the clockwise direction, with the pawl(s) 84 freewheeling across the shallow sides 96 of the toothed ratchet surface 82 and/or with the lock surface 105 moving axially within the recess 107 away from the stop surface 106 within axial space (in the direction of the shaft axis C') provided by the recess 107. The pawl(s) 84, if employed, may engage one of the steep sides 94 of one of the ratchet teeth 92 to inhibit the toolless shaft nut assembly 54 from loosening, thus securing the one of the plurality of wheels 18 onto the wheel shaft 72. Alternatively or additionally, the lock surface 105 engages the stop surface 106 to inhibit the toolless shaft nut assembly 54' from loosening too much, thus securing the one of the plurality of wheels 18' onto the wheel shaft 72'.

To remove the one or more of the plurality of wheels 18, 18' the user squeezes the actuator 62 (or the actuators 62', 108 simultaneously towards each other as shown by arrows 109 in FIG. 18) to move the movable link 78, 78' and/or the nut lock 80, 80' from the locked position (FIGS. 10, 18) to the unlocked position (FIG. 9). In the unlocked position, the toolless shaft nut assembly 54, 54' is no longer engaged with the external threads 88, 88' (i.e., is threadedly disengaged) and can be removed (e.g., pulled off the wheel shaft 72, 72'). Then, the one of the plurality of wheels 18, 18' can be removed (e.g., pulled off the wheel shaft 72, 72').

Although the disclosure has been described in detail with reference to preferred implementations, variations and modifications exist within the scope and spirit of one or more independent aspects of the disclosure as described.

Thus, the disclosure provides, among other things, a toolless shaft nut assembly 54, 54' for removably coupling a wheel 18, 18' to the deck 14 of a garden tool 12. The toolless shaft nut assembly 54, 54' is self-locking. The disclosure also provides a method for changing the deck height H1 of a garden tool 12 by interchangeably attaching wheels 18, 18' having different sizes. The wheels 18, 18' may be toollessly interchangeable by using the toolless shaft nut assembly 54, 54'.

What is claimed is:

1. A garden tool, comprising:

a deck;

a motor;

an implement configured to be driven by the motor;

a wheel shaft; and a wheel removably coupled to the wheel shaft by way of a toolless shaft nut assembly, the toolless shaft nut assembly configured to self-lock, the toolless shaft nut assembly including a manually actuatable actuator and a biasing member that biases the actuator to an engaged position whereby the wheel is engaged with the wheel shaft, the actuator being movable to a disengaged position to disengage the wheel from the wheel shaft.

2. The garden tool of claim 1, wherein the toolless shaft nut assembly is configured to self-lock by way of a nut lock configured to engage a stop surface.

3. The garden tool of claim 2, wherein the nut lock includes one or both of 1) a pawl or 2) a lock surface and wherein the stop surface is configured as one or both of 1) a toothed ratchet defining the stop surface or 2) a recess in the wheel shaft defining the stop surface.

4. The garden tool of claim 2, wherein the nut lock is biased into engagement with the stop surface and manually actuatable to move out of engagement with the stop surface.

5. The garden tool of claim 1, wherein the toolless shaft nut assembly is configured to be unlocked by one or both of 1) a movable link having internal threads and being configured to threadedly disengage from the wheel shaft or 2) a nut lock configured to be movable away from a stop surface with which the nut lock is otherwise configured to be engageable with.

6. The garden tool of claim 1, wherein the toolless shaft nut assembly includes a nut lock, wherein the nut lock is manually movable between a locked position and an unlocked position, wherein in the locked position, the nut lock is configured to engage the wheel shaft, and in the unlocked position, the nut lock is configured to disengage from the wheel shaft such that the toolless shaft nut assembly is removable from the wheel shaft.

7. The garden tool of claim 6, wherein the nut lock is configured to slide between the locked and unlocked positions into and out of a recess in the wheel shaft.

8. The garden tool of claim 6, wherein the toolless shaft nut assembly further includes internal threads configured to engage with external threads of the wheel shaft.

9. The garden tool of claim 1, wherein the toolless shaft nut assembly includes internal threads configured to mesh with external threads on the wheel shaft.

10. A robotic lawn mower movable along a support surface, the robotic lawn mower comprising:

a deck;

a motor;

a blade configured to be driven by the motor;

a wheel shaft; and a wheel removably coupled to the wheel shaft by way of a toolless shaft nut assembly, the toolless shaft nut assembly configured to self-lock, the toolless shaft nut assembly including a manually actuatable actuator and a biasing member that biases the actuator to an engaged position whereby the wheel is engaged with the wheel shaft, the actuator being movable to a disengaged position to disengage the wheel from the wheel shaft.

11. The robotic lawn mower of claim 10, wherein the toolless shaft nut assembly is configured to be unlocked by one or both of 1) a movable link having internal threads and being configured to threadedly disengage from the wheel shaft or 2) a nut lock configured to be movable away from a stop surface with which the nut lock is otherwise configured to be engageable with.

12. The robotic lawn mower of claim 10, wherein the toolless shaft nut assembly includes a nut lock configured to engage a stop surface.

13. The robotic lawn mower of claim 12, wherein the nut lock includes one or both of 1) a pawl or 2) a lock surface and wherein the stop surface is configured as one or both of 1) a toothed ratchet defining the stop surface or 2) a recess in the wheel shaft defining the stop surface.

14. The robotic lawn mower of claim 10, wherein a deck height of the deck with respect to the support surface is adjustable by selecting the wheel from a plurality of wheels including a first wheel having a first diameter and a second wheel having a second diameter different from the first diameter, wherein the first diameter corresponds to a first deck height and the second diameter corresponds to a second deck height different from the first deck height.

15. A method of selecting a deck height of a garden tool with respect to a support surface on which the garden tool moves, the method comprising:

selecting a wheel from a plurality of wheels including a first wheel having a first diameter and a second wheel having a second diameter different from the first diameter, wherein the first diameter corresponds to a first deck height and the second diameter corresponds to a second deck height different from the first deck height;

installing the selected wheel on the garden tool by manually attaching a self-locking nut such that the selected wheel is secured to a wheel shaft without the use of a tool, attaching the self-locking nut including manually actuating an actuator to a disengaged position against the bias of a biasing member and releasing the actuator whereby the biasing member relaxes and facilitates engagement between the selected wheel with the wheel shaft.

16. The method of claim 15, wherein attaching the self-locking nut further includes causing a nut lock to be engageable with a stop surface to provide the self-locking.

17. The method of claim 15, further comprising removing the selected wheel from the garden tool by manually unlocking the self-locking nut.

18. The method of claim 17, wherein manually unlocking includes one or both of 1) causing a movable link to threadedly disengage from a wheel shaft or 2) moving a nut lock away from a stop surface with which the nut lock is otherwise configured to engage.

19. The method of claim 18, wherein moving the nut lock away from the stop surface includes pushing the nut lock.

20. The method of claim 18, wherein manually unlocking includes moving one or both of the movable link or the nut lock against a biasing force.

* * * * *